US012594937B2

(12) United States Patent
Inoue et al.

(10) Patent No.: US 12,594,937 B2
(45) Date of Patent: Apr. 7, 2026

(54) DRIVING ASSISTANCE DEVICE AND DRIVING ASSISTANCE METHOD

(71) Applicants: DENSO CORPORATION, Kariya-city (JP); TOYOTA JIDOSHA KABUSHIKI KAISHA, Toyota (JP)

(72) Inventors: Tomohiko Inoue, Kariya-city (JP); Youhei Masui, Kariya-city (JP); Hiroaki Niino, Kariya-city (JP); Yuki Tezuka, Toyota (JP); Naoki Kusumoto, Toyota (JP); Yuuji Kosaka, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 449 days.

(21) Appl. No.: 17/805,214

(22) Filed: Jun. 2, 2022

(65) Prior Publication Data

US 2022/0289190 A1 Sep. 15, 2022

Related U.S. Application Data

(63) Continuation of application No. PCT/JP2020/045261, filed on Dec. 4, 2020.

(30) Foreign Application Priority Data

Dec. 6, 2019 (JP) ................................. 2019-221485

(51) Int. Cl.
*G05D 1/00* (2024.01)
*B60W 30/095* (2012.01)
(Continued)

(52) U.S. Cl.
CPC ...... *B60W 30/143* (2013.01); *B60W 30/0956* (2013.01); *B60W 30/16* (2013.01);
(Continued)

(58) Field of Classification Search
CPC .................................................. B60W 30/143
See application file for complete search history.

(56) References Cited

U.S. PATENT DOCUMENTS 9,805,601 B1 * 10/2017 Fields .................... G06V 20/58
2005/0123173 A1 6/2005 Isaji et al.
(Continued)

FOREIGN PATENT DOCUMENTS

| JP | 2009-166729 A | | 7/2009 |
|----|----|----|----|
| JP | 2016068684 A | * | 5/2016 |
| JP | 2017-174204 A | | 9/2017 |
| JP | 2018200593 A | * | 12/2018 |

*Primary Examiner* — Vivek D Koppikar
*Assistant Examiner* — Paul W Arellano
(74) *Attorney, Agent, or Firm* — Precision Patents, P.C.

(57) ABSTRACT

A driving assistance device includes a determination unit that determines whether a brake light of a preceding vehicle located in front of a vehicle is turned on, based on a lighting state of a headlight of the preceding vehicle and an acceleration/deceleration of the preceding vehicle, a calculation unit that calculates a target acceleration/deceleration of the vehicle, based on a determination by the determination unit of whether the brake light of the preceding vehicle is turned on, and a control unit that controls the vehicle so that an acceleration/deceleration of the vehicle corresponds to the target acceleration/deceleration.

26 Claims, 10 Drawing Sheets

(51) Int. Cl.

| | |
|---|---|
| *B60W 30/14* | (2006.01) |
| *B60W 30/16* | (2020.01) |
| *B60W 40/04* | (2006.01) |
| *G06V 10/60* | (2022.01) |
| *G06V 20/58* | (2022.01) |
| *H04W 4/46* | (2018.01) |

(52) U.S. Cl.
CPC ............. *B60W 40/04* (2013.01); *G06V 10/60* (2022.01); *G06V 20/584* (2022.01); *H04W 4/46* (2018.02); *B60W 2420/403* (2013.01); *B60W 2554/80* (2020.02); *B60W 2556/65* (2020.02)

(56) References Cited

U.S. PATENT DOCUMENTS

| | | | | |
|---|---|---|---|---|
| 2012/0007727 A1* | 1/2012 | Lin | .......................... | B60Q 1/44 340/432 |
| 2015/0098612 A1* | 4/2015 | Sato | .......................... | G01J 3/46 382/103 |
| 2016/0321924 A1* | 11/2016 | Lewis | ................. | B60W 40/109 |
| 2017/0043835 A1* | 2/2017 | Li | ........................... | B62J 45/414 |
| 2017/0066368 A1* | 3/2017 | Miller | ..................... | B60Q 1/08 |
| 2017/0181684 A1* | 6/2017 | Lian | ..................... | A61B 5/0077 |
| 2018/0162394 A1* | 6/2018 | Kamiya | ............ | B60W 30/0953 |
| 2018/0357897 A1* | 12/2018 | Weinfield | ......... | G08G 1/096758 |
| 2019/0256064 A1* | 8/2019 | Hecker | .................... | B60T 8/88 |

* cited by examiner

DRIVING ASSISTANCE DEVICE AND DRIVING ASSISTANCE METHOD

CROSS-REFERENCE TO RELATED APPLICATION

This application is a continuation application of International Application No. PCT/JP2020/045261 filed Dec. 4, 2020 which designated the U.S. and claims priority to Japanese Patent Application No. 2019-221485 filed Dec. 6, 2019, the contents of each of which are incorporated herein by reference.

BACKGROUND

Technical Field

The present disclosure relates to a driving assistance device and a driving assistance method.

Related Art

A conventionally known driving assistance device changes a target acceleration/deceleration of a vehicle, based on a lighting state of brake lights of a preceding vehicle in front of the vehicle.

BRIEF DESCRIPTION OF THE DRAWINGS

In the accompanying drawings:

FIG. 5 is a schematic diagram showing the case where brake lights of a preceding vehicle are determined to be turned on;

FIG. 7 is a schematic diagram showing the case where brake lights of the preceding vehicle are determined to be turned on;

FIG. 9 is a diagram of a camera image showing the case where a red light of a traffic signal is turned on;

FIG. 10 is a diagram of a camera image showing the case where brake lights of uncontrolled vehicles are turned on.

DESCRIPTION OF SPECIFIC EMBODIMENTS

Figure 1A:
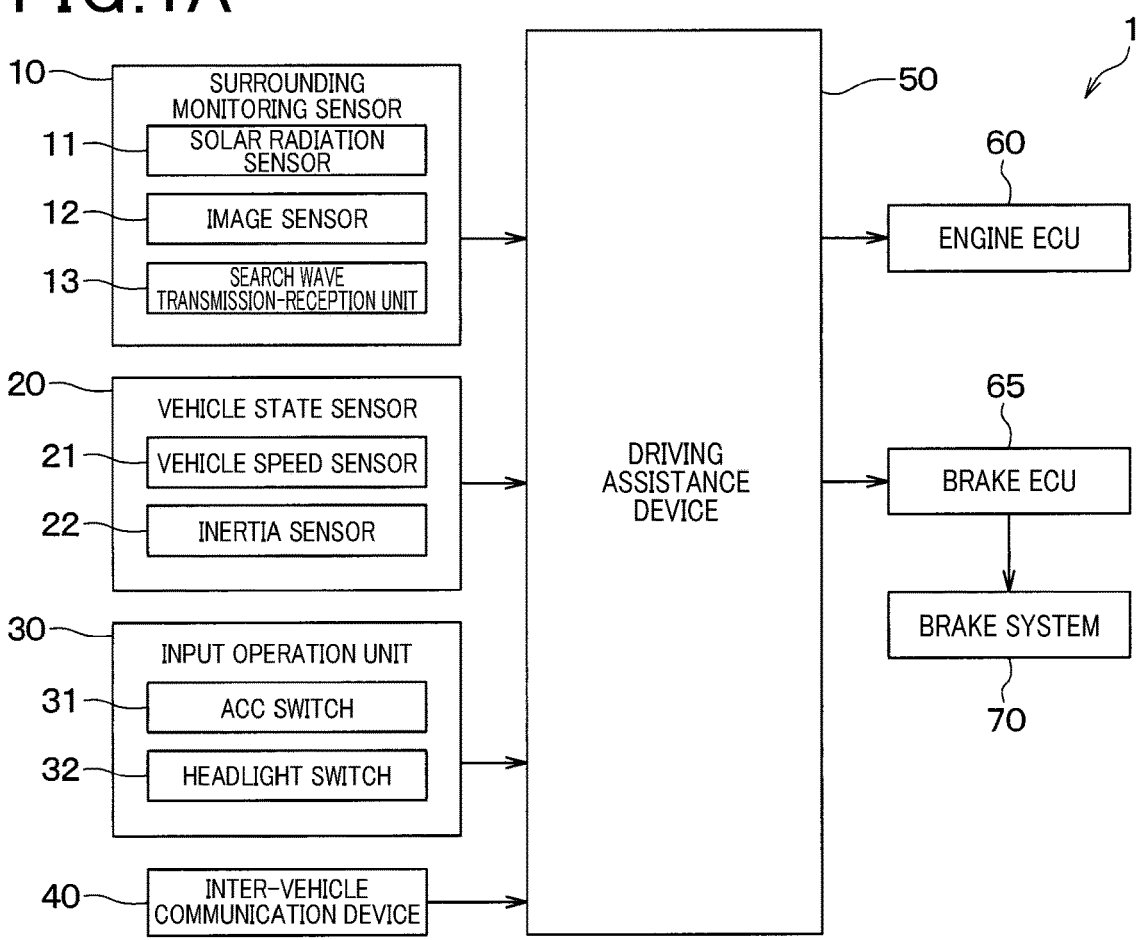
FIG. 1A is a configuration diagram of an in-vehicle system including a driving assistance device of one embodiment.

According to studies by the inventors regarding the above known driving assistance device as described in JP 2016-68684 A, when headlights of the preceding vehicle are turned on, tail lamps of the preceding vehicle that also serve as the brake lights of the preceding vehicle are turned on, and this may cause the device to erroneously determine that the brake lights of the preceding vehicle are turned on and the preceding vehicle is decelerated. This may cause, for example, the vehicle to be decelerated even though the preceding vehicle is not decelerated. Thus, in some cases, the vehicle fails to be appropriately decelerated.

In view of the above, it is desired to have a driving assistance device that allows a vehicle following a preceding vehicle to be appropriately decelerated.

One aspect of the present disclosure provides a driving assistance device includes a determination unit that determines whether a brake light of a preceding vehicle located in front of a vehicle is turned on, based on a lighting state of a headlight of the preceding vehicle and an acceleration/deceleration of the preceding vehicle, a calculation unit that calculates a target acceleration/deceleration of the vehicle, based on a determination by the determination unit of whether the brake light of the preceding vehicle is turned on, and a control unit that controls the vehicle so that an acceleration/deceleration of the vehicle corresponds to the target acceleration/deceleration.

Another aspect of the present disclosure provides a driving assistance device includes a determination unit that determines whether at least one of a plurality of brake lights arranged in a width direction in a rear portion of a preceding vehicle located in front of a vehicle is turned on, based on a lighting state of an auxiliary brake light that is disposed at a different position from the brake lights of the preceding vehicle and is turned on when at least one of the brake lights of the preceding vehicle is turned on, a calculation unit that calculates a target acceleration/deceleration of the vehicle, based on a determination by the determination unit of whether at least one of the brake lights of the preceding vehicle is turned on, and a control unit that controls the vehicle so that an acceleration/deceleration of the vehicle corresponds to the target acceleration/deceleration.

Still another aspect of the present disclosure provides a driving assistance method including: determining whether a brake light of a preceding vehicle located in front of a vehicle is turned on, based on a lighting state of a headlight of the preceding vehicle and an acceleration/deceleration of the preceding vehicle; calculating a target acceleration/deceleration of the vehicle, based on a determination of whether the brake light of the preceding vehicle is turned on; and controlling the vehicle so that an acceleration/deceleration of the vehicle corresponds to the target acceleration/deceleration.

Still another aspect of the present disclosure provides a driving assistance method including: determining whether at least one of a plurality of brake lights arranged in a width direction in a rear portion of a preceding vehicle located in front of a vehicle is turned on, based on a lighting state of an auxiliary brake light that is disposed at a different position from the brake lights of the preceding vehicle and is turned on when at least one of the brake lights of the preceding vehicle is turned on; calculating a target acceleration/deceleration of the vehicle, based on a determination of whether at least one of the brake lights of the preceding vehicle is turned on; and controlling the vehicle so that an acceleration/deceleration of the vehicle corresponds to the target acceleration/deceleration.

Thus, a vehicle following a preceding vehicle can be appropriately decelerated.

Reference numerals in parentheses attached to the components indicate an example of a correspondence relationship between the components and specific components in the embodiments described later.

Embodiments will be described below with reference to the drawings. In the following description of the embodiments, components identical or equivalent to each other are denoted by the same reference numerals and will not be redundantly described.

A driving assistance device 50 of the present embodiment is applied to an in-vehicle system 1 of a vehicle 80, and assists travel of the vehicle 80. First, the in-vehicle system 1 will be described.

As shown in FIG. 1A, the in-vehicle system 1 includes a surrounding monitoring sensor 10, a vehicle state sensor 20, an input operation unit 30, an inter-vehicle communication device 40, the driving assistance device 50, an engine ECU 60, a brake ECU 65, and a brake system 70.

The surrounding monitoring sensor 10 outputs a signal corresponding to an environment around the vehicle 80 to the driving assistance device 50 (described later). Specifically, the surrounding monitoring sensor 10 includes a solar radiation sensor 11, an image sensor 12, and a search wave transmission-reception unit 13.

The solar radiation sensor 11 outputs, to the driving assistance device 50, a signal corresponding to an amount of solar radiation Ms from the outside of the vehicle 80.

The image sensor 12 includes a camera, and captures an image of an area in front of, behind, and beside the vehicle 80. The image sensor 12 outputs the captured camera image to the driving assistance device 50, Furthermore, based on the captured image, the image sensor 12 outputs information, for example, on the type of an obstacle around the vehicle 80 to the driving assistance device 50.

The search wave transmission-reception unit 13 transmits a search wave such as a millimeter wave, a sonar wave, or an infrared ray to an object in front of the vehicle 80. Furthermore, the search wave transmission-reception unit 13 receives a search wave reflected by the object. Then, based on information obtained from the search wave, the search wave transmission-reception unit 13 outputs, to the driving assistance device 50, a signal corresponding to a position, a speed, and an acceleration/deceleration of the object in front of the vehicle 80. An acceleration/deceleration refers to both an acceleration and a deceleration. An acceleration is an increase in speed per unit time. A deceleration is a reduction in speed per unit time. Here, a forward direction refers to a direction in which the vehicle 80 is accelerated.

The vehicle state sensor 20 outputs a signal corresponding to a traveling state of the vehicle 80 to the driving assistance device 50. Specifically, the vehicle state sensor 20 includes a vehicle speed sensor 21 and an inertia sensor 22.

The vehicle speed sensor 21 outputs a signal corresponding to a speed of the vehicle 80 to the driving assistance device 50.

The inertia sensor 22 includes a gyro sensor and an acceleration sensor, and outputs a signal corresponding to an acceleration/deceleration of the vehicle 80 to the driving assistance device 50.

The input operation unit 30 outputs a signal indicating an operation setting to the driving assistance device 50, in response to an operation by a driver of the vehicle 80. Specifically, the input operation unit 30 includes an ACC switch 31 and a headlight switch 32.

The ACC switch 31 executes a program of the driving assistance device 50 (described later), in response to an ON/OFF operation by the driver of the vehicle 80. ACC is an abbreviation for Adaptive Cruise Control.

Figure 2:
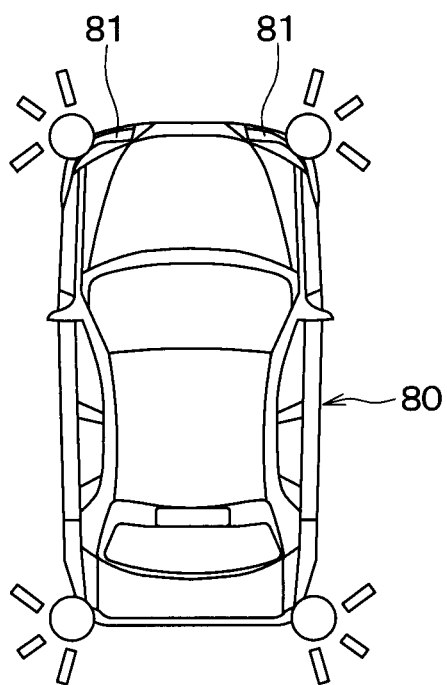
FIG. 2 is a schematic diagram of a vehicle.

As shown in FIG. 2, the headlight switch 32 causes own vehicle headlights 81, which are headlights of the vehicle 80, to be turned on, in response to an ON/OFF operation by the driver of the vehicle 80.

The inter-vehicle communication device 40 performs inter-vehicle communication with another vehicle located around the vehicle 80 to receive information on the vehicle around the vehicle 80, i.e., information on an accelerator operation state, a brake operation state, a headlight operation state, a speed, an acceleration/deceleration, and the like of the vehicle around the vehicle 80. Then, the inter-vehicle communication device 40 outputs the received information on the vehicle around the vehicle 80 to the driving assistance device 50 as shown in FIG. 1A.

Figure 1B:
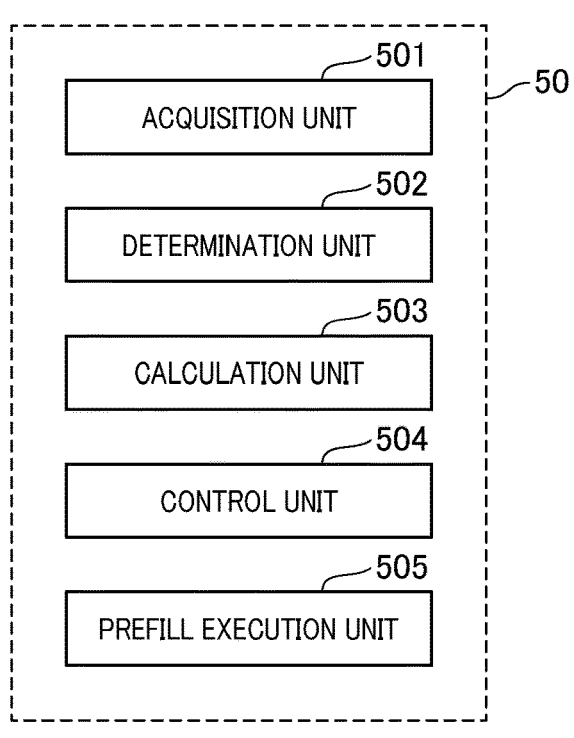
FIG. 1B is a functional block diagram of the driving assistance device.

As shown in FIG. 1B, the driving assistance device 50 includes, as functional blocks, an acquisition unit 501, a determination unit 502, a calculation unit 503, a control unit 504, and a prefill execution unit 505. The driving assistance device 50 is mainly composed of a microcomputer and the like, and includes a CPU, a ROM, a RAM, a flash memory, an I/O, a bus line connecting these components, and the like. The driving assistance device 50 executes a program stored in the ROM of the driving assistance device 50, and outputs a command signal to the engine ECU 60 and the brake ECU 65 (described later). The ROM, the RAM, and the flash memory are non-transitory tangible storage media.

The functions of the functional blocks 501-505 may be implemented by the CPU executing computer the program. In the process described later, the acquisition unit 501 is responsible for execution of the process step S110, the determination unit 502 is responsible for execution of the process step S140, the calculation unit 503 is responsible for execution of the process steps S120, S150, the control unit 504 is responsible for execution of the process step S200, and the prefill execution unit 505 is responsible for execution of the process step S190.

The engine ECU 60 is mainly composed of a microcomputer and the like, and includes a CPU, a ROM, a RAM, a flash memory, an I/O, a bus line connecting these components, and the like. The engine ECU 60 executes a program stored in the ROM of the engine ECU 60, and controls an engine (not shown) of the vehicle 80, based on a signal from the driving assistance device 50. The ROM, the RAM, and the flash memory are non-transitory tangible storage media.

The brake ECU 65 is mainly composed of a microcomputer and the like, and includes a CPU, a ROM, a RAM, a flash memory, an I/O, a bus line connecting these components, and the like. The brake ECU 65 executes a program stored in the ROM of the brake ECU 65, and controls the brake system 70 of the vehicle 80, based on a signal from the driving assistance device 50. The ROM, the RAM, and the flash memory are non-transitory tangible storage media.

Figure 3:
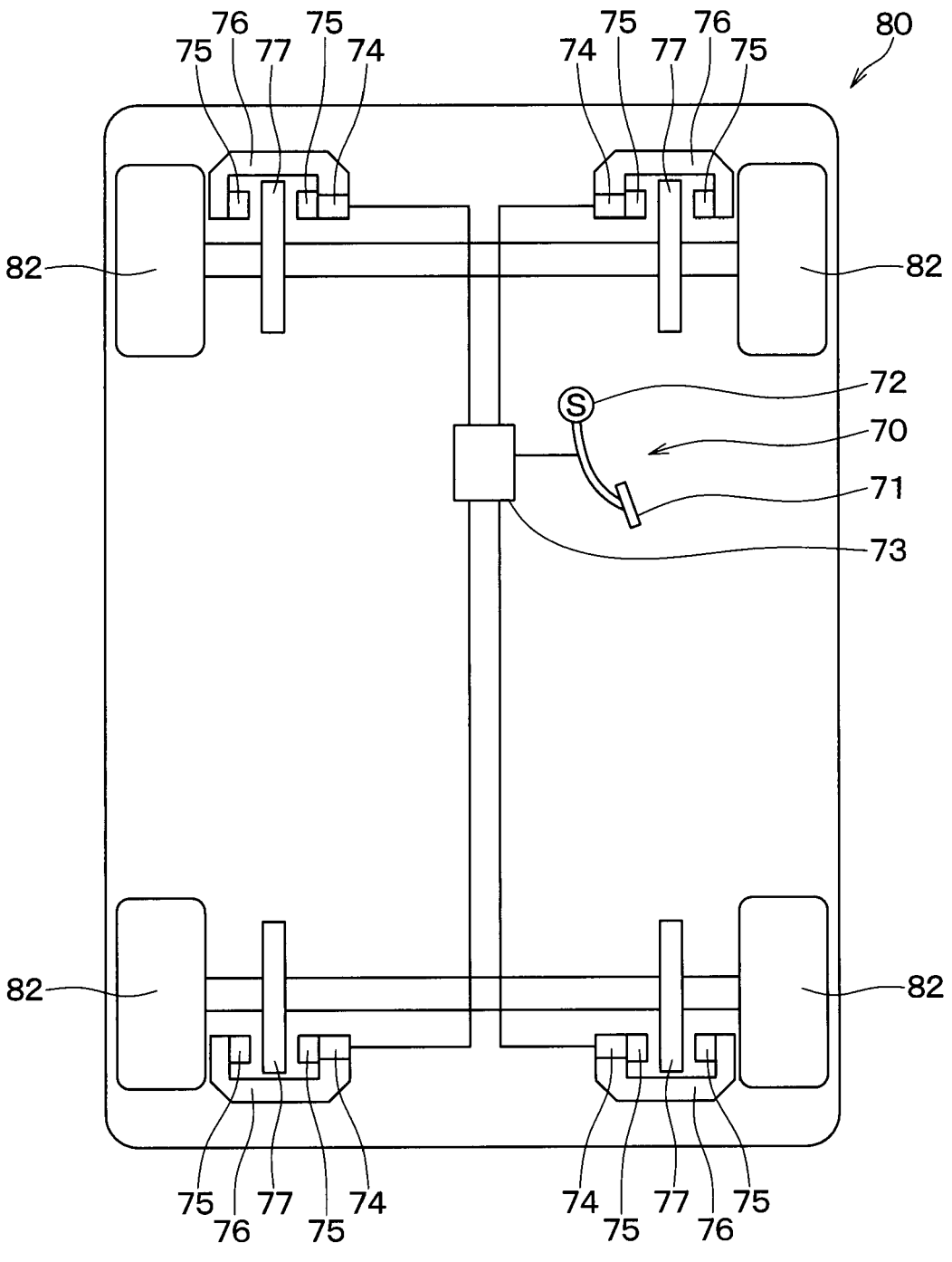
FIG. 3 is a configuration diagram of a brake system of the vehicle.

As shown in FIG. 3, the brake system 70 includes a brake pedal 71, a stroke sensor 72, and a master cylinder 73. Furthermore, the brake system 70 includes a piston 74, two brake pads 75, a brake caliper 76, and a brake disc 77 as a set for each wheel 82 of the vehicle 80.

The brake pedal 71 is pressed by the driver of the vehicle 80. The stroke sensor 72 detects a stroke amount of the brake pedal 71. The master cylinder 73 generates a hydraulic pressure according to the pressing of the brake pedal 71. The generated hydraulic pressure flows to the piston 74 corresponding to each wheel 82. The piston 74 uses the hydraulic pressure to cause the two brake pads 75 to be in contact with the brake disc 77. The brake disc 77 is interposed between the two brake pads 75. The brake caliper 76 supports the piston 74 and the two brake pads 75. The brake disc 77 is rotated together with the wheel 82. In the brake system 70, therefore, when the hydraulic pressure of the piston 74 causes the brake pads 75 to be in contact with the brake disc 77, a rotational speed of the brake disc 77 is reduced; thus, a rotational speed of the wheel 82 rotated together with the brake disc 77 is also reduced. This causes the vehicle 80 to be decelerated.

The in-vehicle system 1 is configured as described above. A process performed by the driving assistance device 50 of the in-vehicle system 1 causes the vehicle 80 to travel following a preceding vehicle 90 located in front of the vehicle 80.

Figure 4:
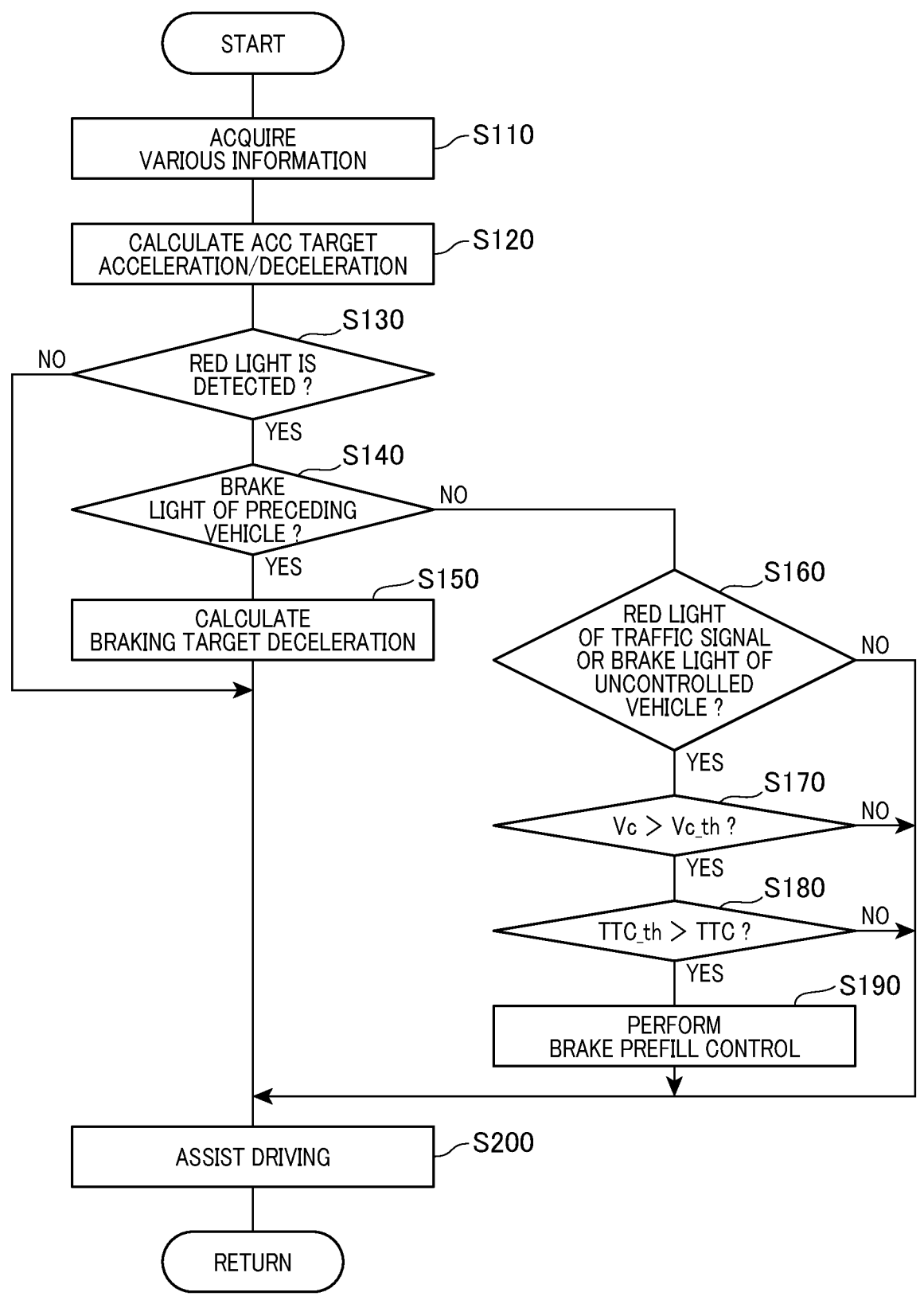
FIG. 4 is a flow chart showing a process performed by a driving assistance device.

Next, the process performed by the driving assistance device 50 will be described with reference to a flow chart in FIG. 4. The driving assistance device 50 executes a program stored in the ROM of the driving assistance device 50 when the ACC switch 31 is ON and the preceding vehicle 90 located in front of the vehicle 80 is detected. The detection of the preceding vehicle 90 located in front of the vehicle 80 is performed, for example, by detection, by the surrounding monitoring sensor 10, of another vehicle located in a pre-determined region in front of the vehicle 80. Information on the preceding vehicle 90 detected by the surrounding moni-toring sensor 10 is outputted to the driving assistance device 50.

In step S110, the driving assistance device 50 acquires various information from the surrounding monitoring sensor 10, the vehicle state sensor 20, the input operation unit 30, and the inter-vehicle communication device 40. For example, the driving assistance device 50 acquires, from the search wave transmission-reception unit 13, an inter-vehicle distance between the vehicle 80 and the preceding vehicle 90, and a speed and an acceleration/deceleration of the preceding vehicle 90. The driving assistance device 50 acquires a speed of the vehicle 80 from the vehicle speed sensor 21. Furthermore, the driving assistance device 50 acquires a camera image captured by the image sensor 12 from the image sensor 12. At this time, the driving assistance device 50 may acquire a speed and an acceleration/decel-eration of the preceding vehicle 90 from the inter-vehicle communication device 40.

Subsequently, in step S120, the driving assistance device 50 calculates an ACC target acceleration/deceleration Aacc, which is an acceleration/deceleration at which the inter-vehicle distance between the vehicle 80 and the preceding vehicle 90 is constant, for example, as shown in the follow-ing relational expression (1-1). In the relational expression (1-1), Lp is an inter-vehicle distance between the vehicle 80 and the preceding vehicle 90. Lt is a target inter-vehicle distance between the vehicle 80 and the preceding vehicle 90, and is represented by the following relational expression (1-2). Vf is a speed of the preceding vehicle 90. Vc is a speed of the vehicle 80. K1 is a feedback gain of the error between the inter-vehicle distance and the target inter-vehicle dis-tance, and is set by an experiment, a simulation, or the like. K2 is a feedback gain of the error in the relative speed of the preceding vehicle 90 to the vehicle 80, and is set by an experiment, a simulation, or the like. In the relational expression (1-2), h is set, for example, based on a time required for the vehicle 80 to reach a position of the preceding vehicle 90 when the vehicle 80 travels at the current speed of the vehicle 80. Ls is a constant set by an experiment, a simulation, or the like.

$$Aacc=K1\times(Lp-Lt)+K2\times(Vf-Vc) \qquad (1\text{-}1)$$

$$Lt=h\times Vc+Ls \qquad (1\text{-}2)$$

Subsequently, in step S130, the driving assistance device 50 determines whether a red light is present, based on the camera image acquired in step S110 and an RGB value of a brightness of the camera image. Here, a red light refers to a light in red.

For example, the driving assistance device 50 scans a pixel block set in advance, in a camera image in which an area in front of the vehicle 80 is displayed. In this case, when the average of an R proportion of the RGB value of the brightness in the pixel block is equal to or greater than a threshold, a position of the red light in the camera image is determined, and the process proceeds to step S140. When the average of the R proportion of the RGB value of the brightness in the pixel block is less than the threshold, no red light is detected; thus, the process proceeds to step S200.

Figure 6:
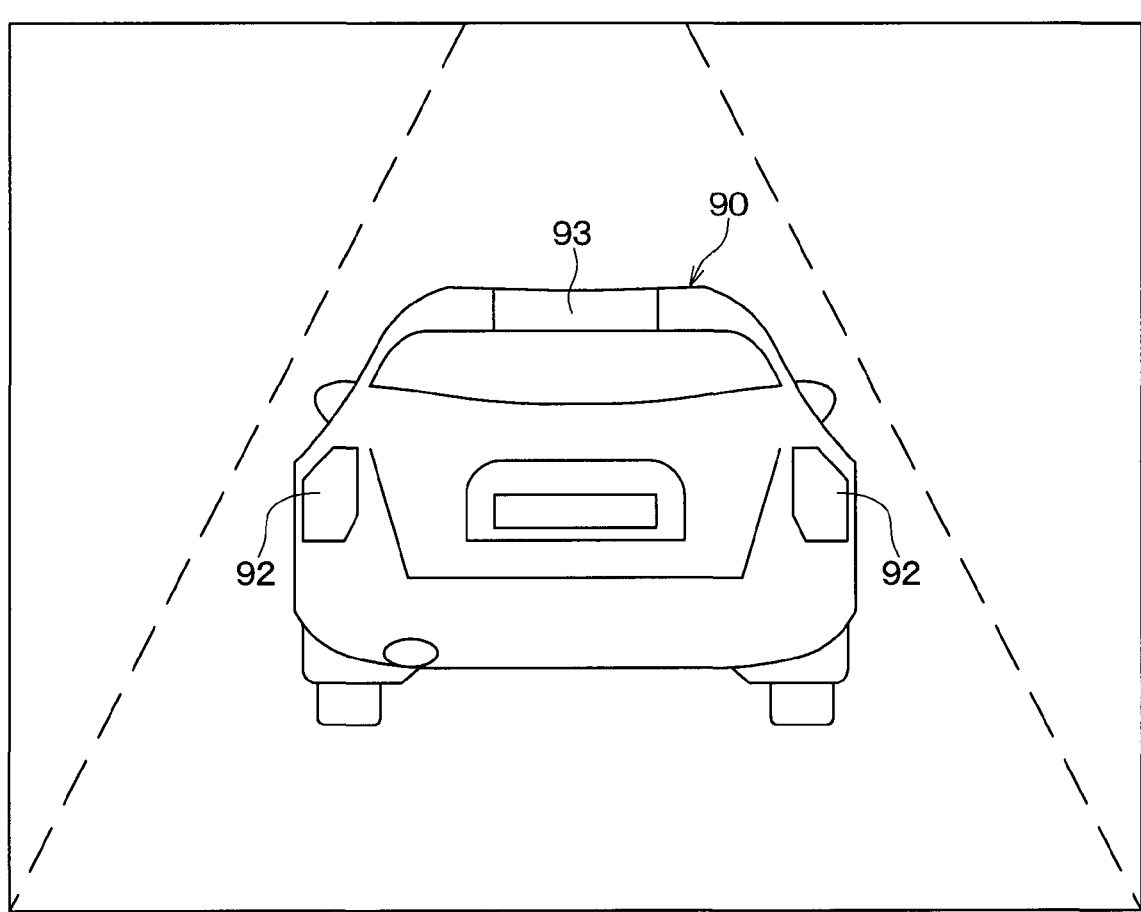
FIG. 6 is a diagram of a camera image of a rear portion of the preceding vehicle.

In step S140 subsequent to step S130, the driving assis-tance device 50 determines whether the red light detected in step S130 is one of preceding vehicle brake lights 92, which are brake lights of the preceding vehicle 90, turned on. The driving assistance device 50 performs the determination based on a lighting state of preceding vehicle headlights 91, which are headlights of the preceding vehicle 90, the accel-eration/deceleration of the preceding vehicle 90, and a lighting state of an auxiliary brake light 93 of the preceding vehicle 90. The preceding vehicle brake lights 92 also serve as tail lamps of the preceding vehicle 90. In some embodi-ments, the auxiliary brake light 93 comprises a third brake light of the preceding vehicle 90, as illustrated in FIG. 6.

Specifically, the driving assistance device 50 determines whether the preceding vehicle headlights 91 are turned on, based on a change in the brightness that is a change over time in the brightness of the image of the area in front of the vehicle 80 acquired in step S110. For example, when the vehicle 80 and the preceding vehicle 90 enter a tunnel, or during a transition from daytime to nighttime, a change in the brightness of the background other than the preceding vehicle 90 displayed in the image of the area in front of the vehicle 80 is equal to or greater than a threshold. In this case, the driving assistance device 50 determines that the preced-ing vehicle headlights 91 are turned on. The threshold for the change in the brightness used to determine whether the preceding vehicle headlights 91 are turned on is set by an experiment, a simulation, or the like. In the case where the preceding vehicle headlights 91 are turned on, the driving assistance device 50 determines whether the preceding vehicle 90 is decelerated, based on the acceleration/decel-eration of the preceding vehicle 90 acquired from the search wave transmission-reception unit 13 in step S110. For example, when the acceleration/deceleration of the preced-ing vehicle 90 has a negative value, the driving assistance device 50 determines that the preceding vehicle 90 is decelerated. When the acceleration/deceleration of the pre-ceding vehicle 90 is zero, the driving assistance device 50 determines that the preceding vehicle 90 travels at a constant speed. When the acceleration/deceleration of the preceding vehicle 90 has a positive value, the driving assistance device 50 determines that the preceding vehicle 90 is accelerated.

Figure 5:
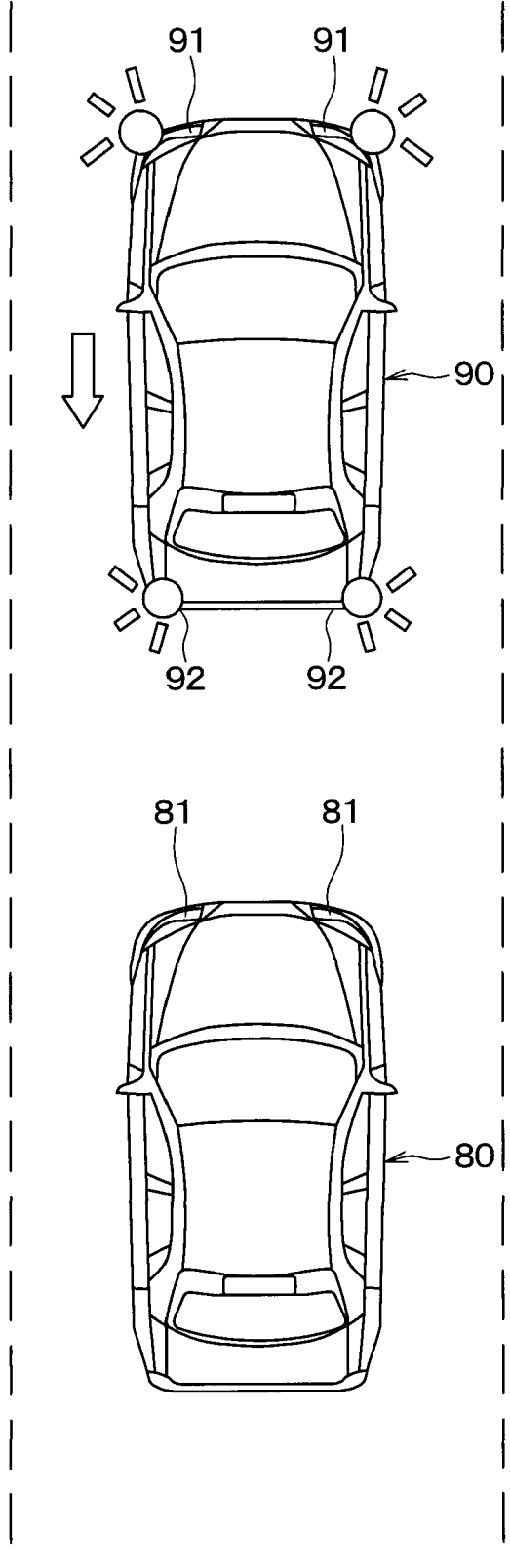

In the case where the preceding vehicle headlights 91 are turned on and the preceding vehicle 90 is decelerated as shown in FIG. 5, the driving assistance device 50 determines that the preceding vehicle brake lights 92 are turned on. In FIG. 5, the deceleration of the preceding vehicle 90 is schematically indicated by an arrow.

In the case where the preceding vehicle headlights 91 are turned on but the preceding vehicle 90 travels at a constant speed or is accelerated, the driving assistance device 50 determines that the preceding vehicle brake lights 92 are not turned on. Furthermore, when the change in the brightness of the background other than the preceding vehicle 90 displayed in the image of the area in front of the vehicle 80 is less than the threshold, the driving assistance device 50 determines that the preceding vehicle headlights 91 are not turned on. In the case where the preceding vehicle headlights 91 are not turned on, the driving assistance device 50 determines whether the preceding vehicle brake lights 92 are turned on, based on the lighting state of the auxiliary brake light 93 of the preceding vehicle 90. Even in the case where the acceleration/deceleration of the preceding vehicle 90 is not detected, the driving assistance device 50 determines whether the preceding vehicle brake lights 92 are turned on, based on the lighting state of the auxiliary brake light 93 of the preceding vehicle 90.

As shown in FIG. 6, two preceding vehicle brake lights 92 are arranged in the width direction in a rear portion of the preceding vehicle 90. The auxiliary brake light 93 of the preceding vehicle 90 is disposed at a different position from the preceding vehicle brake lights 92 in the rear portion of the preceding vehicle 90, for example, at an upper middle portion of the rear portion of the preceding vehicle 90. The auxiliary brake light 93 of the preceding vehicle 90 is turned on when the preceding vehicle brake lights 92 are turned on, irrespective of the lighting state of the preceding vehicle headlights 91.

Figure 7:
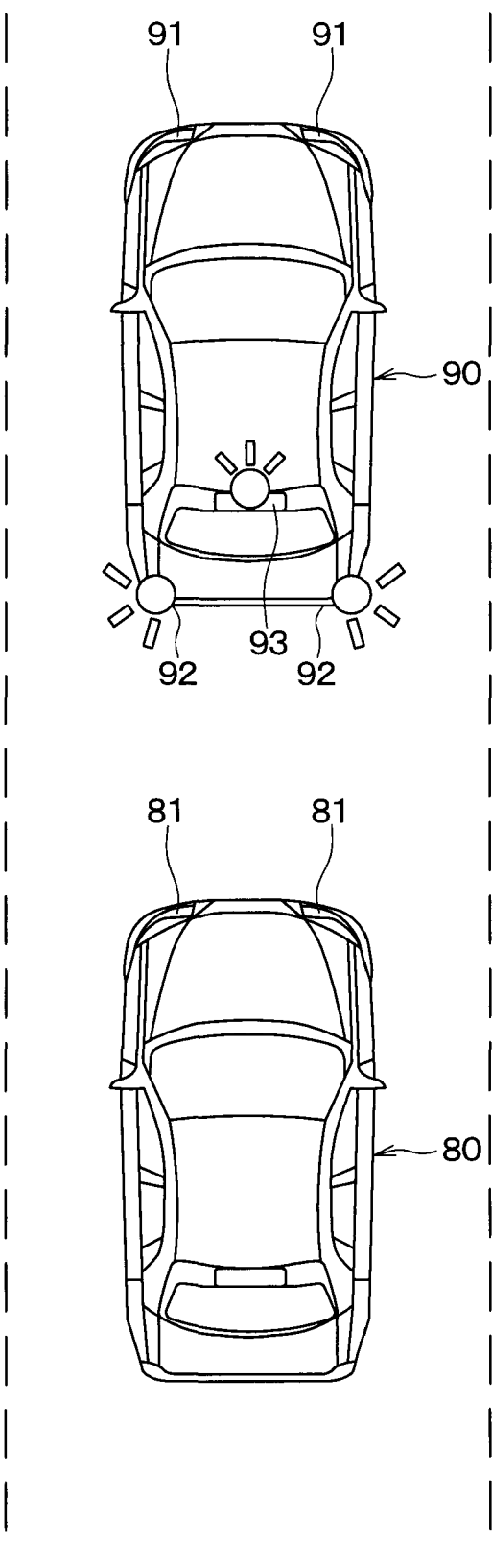

Thus, the driving assistance device 50 determines the lighting state of the auxiliary brake light 93 of the preceding vehicle 90, based on the brightness of the rear portion of the preceding vehicle 90 displayed in the image acquired in step S110. Specifically, the driving assistance device 50 compares the brightness of the auxiliary brake light 93 of the preceding vehicle 90 with the brightness of a portion around the auxiliary brake light 93 of the preceding vehicle 90 to obtain a difference in the brightness. For example, when a difference between the brightness of the auxiliary brake light 93 of the preceding vehicle 90 and the brightness of the middle portion of the rear portion of the preceding vehicle 90 is equal to or greater than a threshold, the auxiliary brake light 93 of the preceding vehicle 90 is turned on; thus, the driving assistance device 50 determines that the preceding vehicle brake lights 92 are turned on as shown in FIG. 7. When the difference between the brightness of the auxiliary brake light 93 of the preceding vehicle 90 and the brightness of the middle portion of the rear portion of the preceding vehicle 90 is less than the threshold, the auxiliary brake light 93 of the preceding vehicle 90 is not turned on; thus, the driving assistance device 50 determines that the preceding vehicle brake lights 92 are not turned on. The threshold for the brightness used to determine the lighting state of the auxiliary brake light 93 of the preceding vehicle 90 is set by an experiment, a simulation, or the like.

In this manner, the driving assistance device 50 determines whether the preceding vehicle brake lights 92 are turned on. In the case where the preceding vehicle brake lights 92 are turned on, the process proceeds to step S150. In the case where the preceding vehicle brake lights 92 are not turned on, the process proceeds to step S160.

Figure 8:
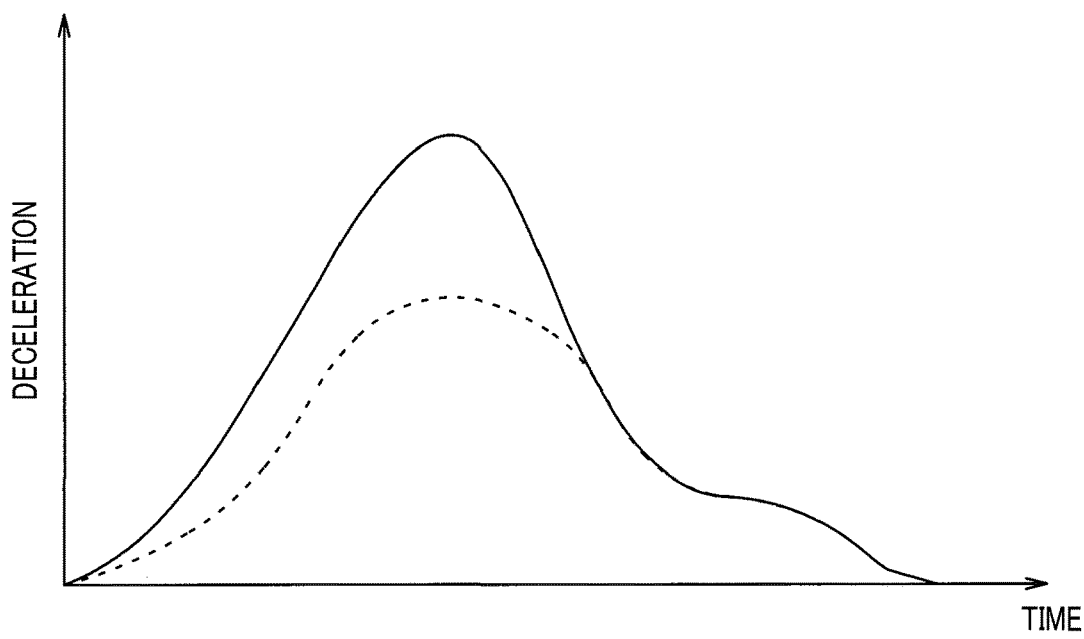
FIG. 8 is a diagram showing a relationship of a deceleration with time.

In step S150 subsequent to step S140, the driving assistance device 50 calculates a braking target deceleration Ab, which is a deceleration at which the vehicle 80 is decelerated more than at the ACC target acceleration/deceleration Aacc. For example, as shown in FIG. 8, the absolute value of the braking target deceleration Ab is set to be larger than the absolute value of the deceleration of the ACC target acceleration/deceleration Aacc. The amount of change in the deceleration of the vehicle 80 with respect to time in the case where the deceleration of the vehicle 80 is the braking target deceleration Ab is larger than the amount of change in the deceleration of the vehicle 80 with respect to time in the case where the deceleration of the vehicle 80 is the ACC target acceleration/deceleration Aacc. Then, the process proceeds to step S200. In FIG. 8, the vertical axis indicates the absolute value of the deceleration of the vehicle 80. In FIG. 8, the solid line indicates the change in the deceleration of the vehicle 80 with respect to time in the case where the deceleration of the vehicle 80 is the braking target deceleration Ab. Furthermore, the broken line indicates the change in the deceleration of the vehicle 80 with respect to time in the case where the deceleration of the vehicle 80 is the ACC target acceleration/deceleration Aacc.

Figure 9:
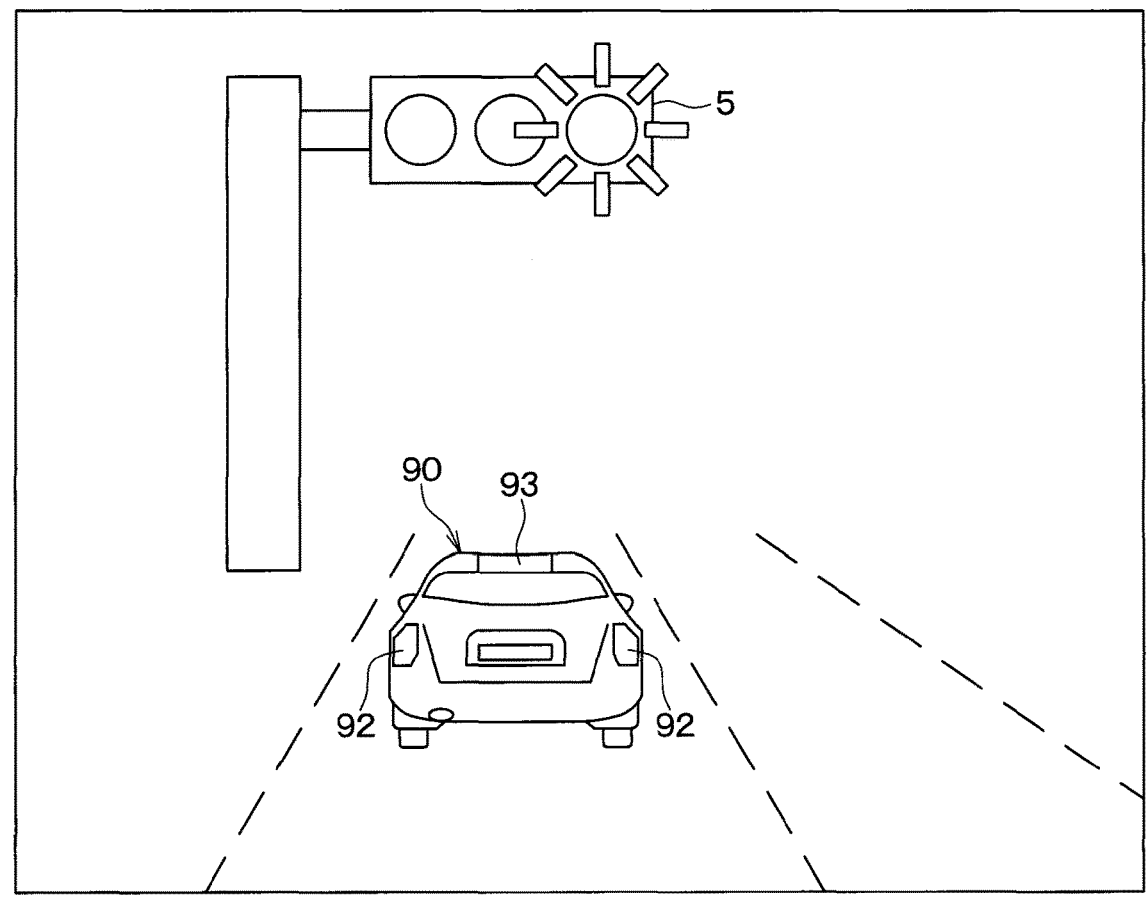

In step S160 subsequent to step S140, the driving assistance device 50 determines whether the red light detected in step S130 is a red light of a traffic signal 5. The driving assistance device 50 detects whether the red light displayed in the camera image captured by the image sensor 12 is the red light of the traffic signal 5, for example, by checking an object with the red light displayed in the camera image against a template image of the traffic signal 5 set in advance. In the case where the red light displayed in the camera image is the red light of the traffic signal 5 as shown in FIG. 9, the process proceeds to step S170.

In the case where the traffic signal 5 displayed in the camera image is not detected, the driving assistance device 50 determines that the red light detected in step S130 is not the red light of the traffic signal 5. Then, the driving assistance device 50 determines whether the red light detected in step S130 is one of brake lights 7 of an uncontrolled vehicle 6. Here, the uncontrolled vehicle 6 refers to a vehicle other than the vehicle 80 and the preceding vehicle 90.

Figure 10:
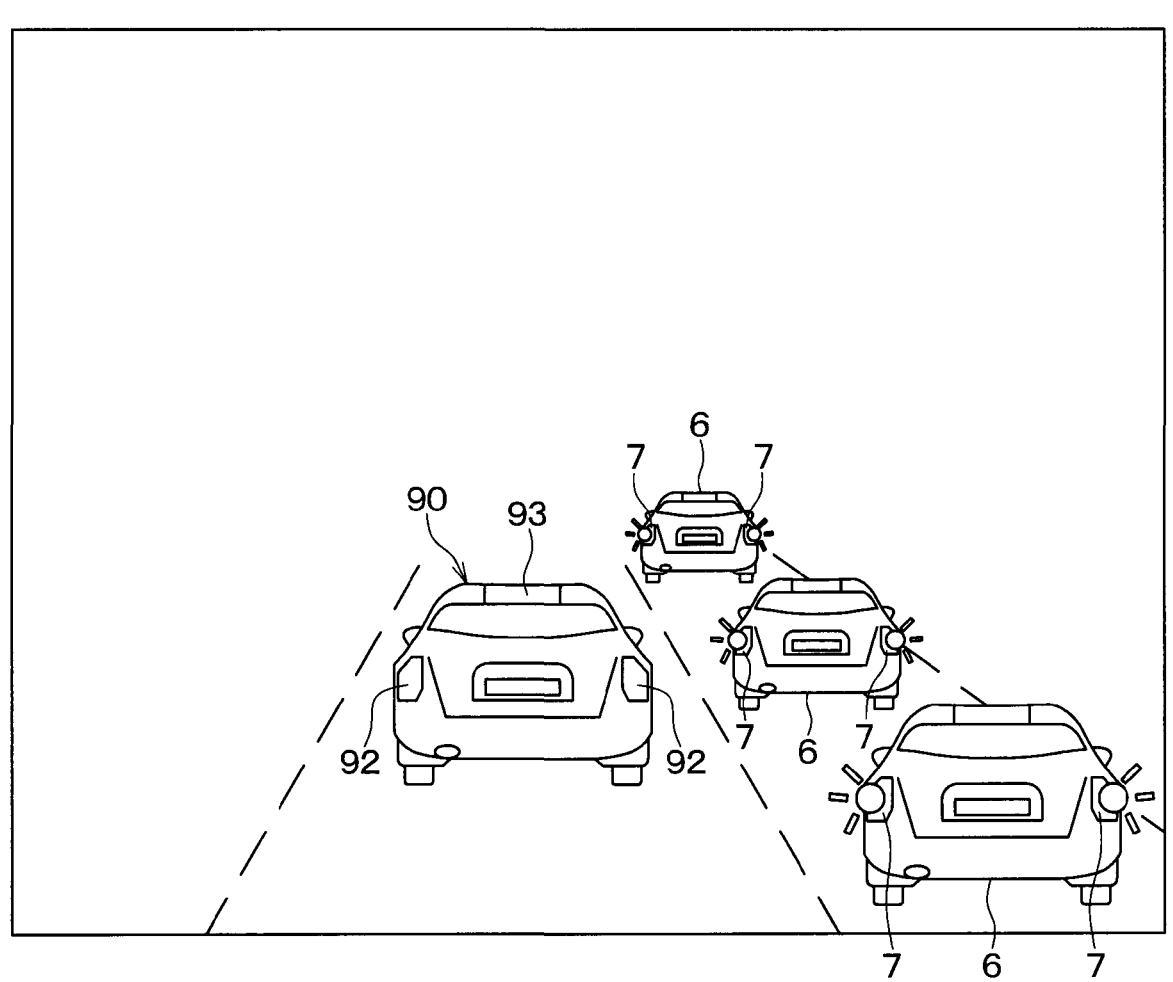

The driving assistance device 50 detects whether the red light displayed in the camera image captured by the image sensor 12 is one of the brake lights 7 of the uncontrolled vehicle 6, for example, by checking the object with the red light against a template image of the uncontrolled vehicle 6 set in advance, except for the preceding vehicle 90 displayed in the camera image. In the case where the red light displayed in the camera image is one of the brake lights 7 of the uncontrolled vehicle 6 as shown in FIG. 10, the process proceeds to step S170. In the case where the uncontrolled vehicle 6 displayed in the camera image is not detected, the driving assistance device 50 determines that the red light detected in step S130 is not one of the brake lights 7 of the uncontrolled vehicle 6. Then, the process proceeds to step S200. In the case described above, the driving assistance device 50 determines whether the red light displayed in the camera image is the red light of the traffic signal 5, and then determines whether the red light displayed in the camera image is one of the brake lights 7 of the uncontrolled vehicle 6. However, the driving assistance device 50 may determine whether the red light displayed in the camera image is one of the brake lights 7 of the uncontrolled vehicle 6, and then determines whether the red light displayed in the camera image is the red light of the traffic signal 5.

Since the red light of the traffic signal 5 is turned on or the brake lights 7 of the uncontrolled vehicle 6 are turned on, in step S170 subsequent to step S160, the driving assistance device 50 determines whether the probability that the vehicle 80 will collide with obstacles such as the preceding vehicle 90, the traffic signal 5, and the uncontrolled vehicle 6 is high. Specifically, the driving assistance device 50 determines whether the speed Vc of the vehicle 80 is greater than a speed threshold Vc_th. When the speed Vc of the vehicle 80 is greater than the speed threshold Vc_th, the process proceeds to step S180. When the own vehicle speed Vc is equal to or less than the speed threshold Vc_th, the process proceeds to step S200. The speed threshold Vc_th is set by an experiment, a simulation, or the like.

In step S180 subsequent to step S170, in order to determine whether the probability that the vehicle 80 will collide with the obstacles is high, the driving assistance device 50 determines whether a TTC between the vehicle 80 and each of the obstacles is less than a time threshold TTC_th. Specifically, the driving assistance device 50 calculates a relative distance between the vehicle 80 and each of the obstacles. Furthermore, the driving assistance device 50 calculates a relative speed of each of the obstacles to the vehicle 80 corresponding to a direction of the relative distance between the vehicle 80 and the corresponding one of the obstacles. Then, for each of the obstacles, the driving assistance device 50 calculates the TTC between the vehicle 80 and the corresponding one of the obstacles by dividing the calculated relative distance by the relative speed corresponding to the relative distance. When the TTC is less than the time threshold TTC_th, the process proceeds to step S190. When the TTC is equal to or greater than the time threshold TTC_th, the process proceeds to step S200. TTC is an abbreviation for Time to Collision. The time threshold TTC_th is set by an experiment, a simulation, or the like.

Figure 11:
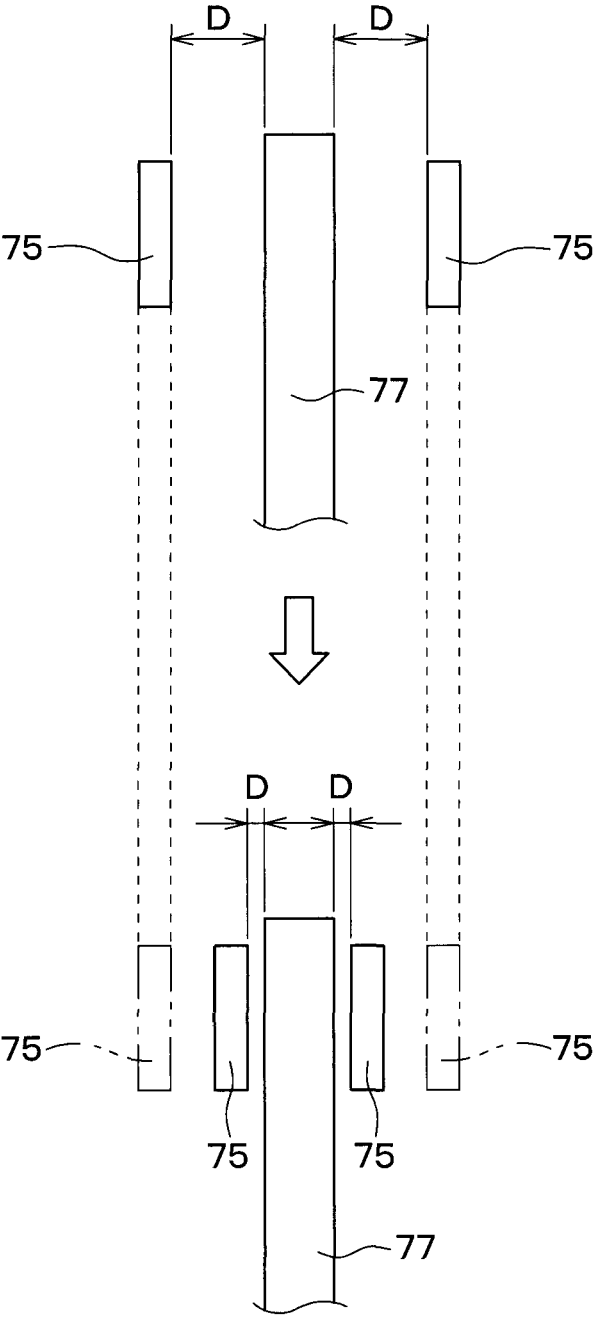
FIG. 11 is a schematic diagram showing a brake prefill control.

In step S190 subsequent to step S180, since the speed Vc of the vehicle 80 is relatively high and the TTC between the vehicle 80 and each of the obstacles is relatively short, the probability that the vehicle 80 will collide with the obstacles is relatively high. Thus, the driving assistance device 50 performs a brake prefill control. Specifically, the driving assistance device 50 outputs a command signal for the control to the brake ECU 65. In response to the signal from the driving assistance device 50, the brake ECU 65 controls the brake system 70 of the vehicle 80. For example, an electric pump (not shown) of the brake system 70 is controlled to increase the hydraulic pressure of the piston 74 of the brake system 70. This causes each of the two brake pads 75 to approach the brake disc 77. Thus, the gap between brake pads 75 and the brake disc 77 is reduced. Here, D represents a distance from the brake pads 75 to the brake disc 77 in the direction in which the brake pads 75 are in contact with the brake disc 77. In this case, as shown in FIG. 11, the distance D from the brake pads 75 to the brake disc 77 is smaller than in the case where the red light of the traffic signal 5 is not turned on and the brake lights 7 of the uncontrolled vehicle 6 are not turned on. In this case, therefore, the responsiveness of the deceleration of the vehicle 80 is high; thus, the vehicle 80 is less likely to collide with the obstacles. Then, the process proceeds to step S200.

In step S200, the driving assistance device 50 assists the driving of the vehicle 80 so that the acceleration/deceleration of the vehicle 80 becomes a target acceleration/deceleration.

Specifically, in the case where the braking target deceleration Ab is not calculated in step S150, the driving assistance device 50 causes the acceleration/deceleration of the vehicle 80 to be the ACC target acceleration/deceleration Aacc. In this case, for example, when the acceleration/deceleration of the vehicle 80 is less than the ACC target acceleration/deceleration Aacc, the driving assistance device 50 outputs, to the engine ECU 60, a command signal for assisting the acceleration/deceleration of the vehicle 80 to become the ACC target acceleration/deceleration Aacc. Then, the engine ECU 60 increases a rotational speed of the engine (not shown) of the vehicle 80, causing the acceleration/deceleration of the vehicle 80 to be the ACC target acceleration/deceleration Aacc. Furthermore, for example, when the acceleration/deceleration of the vehicle 80 is greater than the ACC target acceleration/deceleration Aacc, the driving assistance device 50 outputs, to the brake ECU 65, a command signal for assisting the acceleration/deceleration of the vehicle 80 to become the ACC target acceleration/deceleration Aacc. Then, the brake ECU 65 increases the hydraulic pressure of the piston 74 of the brake system 70; thus, the brake pads 75 are brought into frictional contact with the brake disc 77. This reduces the rotational speed of the wheel 82 together with the rotational speed of the brake disc 77, causing the vehicle 80 to be decelerated. Thus, the acceleration/deceleration of the vehicle 80 becomes the ACC target acceleration/deceleration Aacc.

When the acceleration/deceleration of the vehicle 80 becomes the ACC target acceleration/deceleration Aacc as described above, therefore, the inter-vehicle distance between the vehicle 80 and the preceding vehicle 90 is maintained. Thus, the vehicle 80 travels following the preceding vehicle 90.

In the case where the braking target deceleration Ab is calculated in step S150, the driving assistance device 50 causes the acceleration/deceleration of the vehicle 80 to be the braking target deceleration Ab. In this case, for example, as in the above case, the brake ECU 65 increases the hydraulic pressure of the piston 74 of the brake system 70; thus, the brake pads 75 are brought into frictional contact with the brake disc 77. This causes the vehicle 80 to be decelerated, causing the acceleration/deceleration of the vehicle 80 to be the braking target deceleration Ab.

When the acceleration/deceleration of the vehicle 80 becomes the braking target deceleration Ab as described above, therefore, the inter-vehicle distance between the vehicle 80 and the preceding vehicle 90 is maintained. Thus, the vehicle 80 travels following the preceding vehicle 90. In this case, the acceleration/deceleration of the vehicle 80 is the braking target deceleration Ab, which is the deceleration at which the vehicle 80 is decelerated more than at the ACC target acceleration/deceleration Aacc. This allows the vehicle 80 to be promptly respond to the deceleration of the preceding vehicle 90, and thus the vehicle 80 can safely travel following the preceding vehicle 90.

As described above, the process performed by the driving assistance device 50 allows the vehicle 80 to travel following the preceding vehicle 90.

Next, the driving assistance device 50 allowing appropriate deceleration of the vehicle 80 following the preceding vehicle 90 will be described.

The driving assistance device 50 determines whether the preceding vehicle brake lights 92 are turned on, based on the lighting state of the preceding vehicle headlights 91 and the acceleration/deceleration of the preceding vehicle 90. Specifically, the driving assistance device 50 determines that the preceding vehicle brake lights 92 are turned on, in the case where the preceding vehicle headlights 91 are turned on and the preceding vehicle 90 is decelerated as shown in FIG. 5. Thus, even when the tail lamps that also serve as the preceding vehicle brake lights 92 are turned on, for example, the vehicle 80 following the preceding vehicle 90 can quickly start deceleration of the vehicle 80, and thus can be appropriately decelerated.

Furthermore, the driving assistance device 50 determines whether the preceding vehicle brake lights 92 are turned on, based on the lighting state of the auxiliary brake light 93 disposed at a different position from the preceding vehicle brake lights 92. Specifically, the driving assistance device 50 determines that the preceding vehicle brake lights 92 are turned on, in the case where the auxiliary brake light 93 of the preceding vehicle 90 is determined to be turned on as shown in FIG. 7. Thus, as in the above case, even when the tail lamps that also serve as the preceding vehicle brake lights 92 are turned on, the vehicle 80 following the preceding vehicle 90 can be appropriately decelerated.

The driving assistance device 50 also provides the following advantageous effect.

Assume that the red light of the traffic signal 5 is turned on as shown in FIG. 9 or the brake lights 7 of the uncontrolled vehicles 6 are turned on as shown in FIG. 10 and that the speed Vc of the vehicle 80 is greater than the speed threshold Vc_th and the TTC is less than the time threshold TTC_th. In this case, the driving assistance device 50 performs a brake prefill control. Thus, the gap between the brake pads 75 and the brake disc 77 is smaller than in the case where the red light of the traffic signal 5 is not turned on and the brake lights 7 of the uncontrolled vehicles 6 are not turned on. Specifically, as shown in FIG. 11, the distance D from the brake pads 75 to the brake disc 77 is smaller than in the case where the red light of the traffic signal 5 is not turned on and the brake lights 7 of the uncontrolled vehicles 6 are not turned on. Therefore, the responsiveness of the deceleration of the vehicle 80 is high, thus preventing the vehicle 80 from colliding with the obstacles.

Modification 1-1

In the above embodiment, the driving assistance device 50 determines whether the preceding vehicle headlights 91 are turned on, based on the change in the brightness of the image of the area in front of the vehicle 80 acquired from the image sensor 12. However, the determination may not necessarily be based on the change in the brightness of the image of the area in front of the vehicle 80. The driving assistance device 50 may determine whether the preceding vehicle headlights 91 are turned on, for example, based on the amount of solar radiation Ms from the outside of the vehicle 80. Specifically, in step S110, the driving assistance device 50 acquires, from the solar radiation sensor 11, an amount of solar radiation Ms from the outside of the vehicle 80 in addition to the information described above. Assume that the amount of solar radiation Ms acquired by the driving assistance device 50 is equal to or greater than a solar radiation threshold Ms_th, for example, it is the daytime. In this case, the environment around the vehicle 80 does not require the headlights to be turned on; thus, the driving assistance device 50 determines in step S140 that the preceding vehicle headlights 91 are not turned on. Assume that the amount of solar radiation Ms acquired by the driving assistance device 50 is less than the solar radiation threshold Ms_th, for example, the vehicle 80 and the preceding vehicle 90 enter a tunnel or it is the nighttime. In this case, the environment around the vehicle 80 requires the headlights to be turned on; thus, the driving assistance device 50 determines in step S140 that the preceding vehicle headlights 91 are turned on.

Modification 1-2

The driving assistance device 50 may determine whether the preceding vehicle headlights 91 are turned on, based on a lighting state of the own vehicle headlights 81, in this case, based on an ON/OFF state of the headlight switch 32. Specifically, when the headlight switch 32 is ON, the own vehicle headlights 81 are turned on; thus, the preceding vehicle headlights 91 are assumed to be turned on as with the own vehicle headlights 81. Therefore, when the headlight switch 32 is ON, the driving assistance device 50 determines that the preceding vehicle headlights 91 are turned on. When the headlight switch 32 is OFF, the own vehicle headlights 81 are not turned on; thus, the preceding vehicle headlights 91 are assumed to be not turned on as with the own vehicle headlights 81. Therefore, when the headlight switch 32 is OFF, the driving assistance device 50 determines that the preceding vehicle headlights 91 are not turned on.

Modification 1-3

The driving assistance device 50 may determine whether the preceding vehicle headlights 91 are turned on, based on an ON/OFF state of a headlight switch of the preceding vehicle 90. Specifically, the inter-vehicle communication device 40 performs inter-vehicle communication with the preceding vehicle 90 to acquire an ON/OFF state of the headlight switch of the preceding vehicle 90. In step S110, the driving assistance device 50 acquires, from the inter-vehicle communication device 40, an ON/OFF state of the headlight switch of the preceding vehicle 90 in addition to the information described above. When the headlight switch of the preceding vehicle 90 is ON, the driving assistance device 50 determines in step S140 that the preceding vehicle brake lights 92 are turned on. When the headlight switch of the preceding vehicle 90 is OFF, the driving assistance device 50 determines that the preceding vehicle brake lights 92 are not turned on.

The driving assistance device 50 may determine whether the preceding vehicle headlights 91 are turned on, based on a combination of the change in the brightness of the image of the area in front of the vehicle 80, the amount of solar radiation Ms from the outside of the vehicle 80, the lighting state of the own vehicle headlights 81, and the ON/OFF state of the headlight switch of the preceding vehicle 90.

Modification 2-1

In the above embodiment, the driving assistance device 50 determines whether the preceding vehicle brake lights 92 are turned on, based on the lighting state of the preceding vehicle headlights 91, the acceleration/deceleration of the preceding vehicle 90, and the lighting state of the auxiliary brake light 93 of the preceding vehicle 90. The driving assistance device 50 may not necessarily determine whether the preceding vehicle brake lights 92 are turned on, based on this combination. The driving assistance device 50 may determine whether the preceding vehicle brake lights 92 are turned on, for example, based on a change in the brightness of left and right end portions of the rear portion of the preceding vehicle 90 in the camera image acquired in step S110. Specifically, the driving assistance device 50 determines whether the preceding vehicle brake lights 92 are turned on, based on the change in the brightness from a normal state in which the preceding vehicle brake lights 92 are not turned on.

The brightness when the tail lamps of the preceding vehicle brake lights 92 are turned on is lower than the brightness when the preceding vehicle brake lights 92 are turned on by a brake operation of the preceding vehicle 90. Thus, when the amount of change from the normal state in the brightness of the left and right end portions of the rear portion of the preceding vehicle 90 is equal to or greater than a first threshold and less than a second threshold, the tail lamps of the preceding vehicle brake lights 92 are assumed to be turned on. In this case, therefore, the driving assistance device 50 determines that the preceding vehicle brake lights 92 are not turned on. When the amount of change from the normal state in the brightness of the left and right end portions of the rear portion of the preceding vehicle 90 is equal to or greater than the second threshold, the preceding vehicle brake lights 92 are assumed to be turned on by a brake operation of the preceding vehicle 90. In this case, therefore, the driving assistance device 50 determines that the preceding vehicle brake lights 92 are turned on. The first threshold and the second threshold are set by an experiment, simulation, or the like.

Modification 2-2

The driving assistance device 50 may determine whether the preceding vehicle brake lights 92 are turned on, for example, based on a time to collision ETTC considering an acceleration/deceleration. Specifically, in step S140, the driving assistance device 50 calculates the time to collision ETTC considering the acceleration/deceleration as shown in the following relational expression (2). ETTC is an abbreviation for Enhanced Time to Collision. In the relational expression (2), Vf is the speed of the preceding vehicle 90 as described above. Vc is the speed of the vehicle 80 as described above. Af is an acceleration/deceleration of the preceding vehicle 90. Ac is an acceleration/deceleration of the vehicle 80. Lp is the inter-vehicle distance between the vehicle 80 and the preceding vehicle 90 as described above.

$$ETTC = \frac{-(Vf - Vc) + \sqrt{(Vf - Vc)^2 + 2 \times (Af - Ac) \times Lp}}{Af - Ac} \quad (2)$$

In the case where the time to collision ETTC is reduced from the time to collision ETTC calculated the previous time in step S140, the driving assistance device 50 determines that the preceding vehicle brake lights 92 are turned on. In this case, in step S150 subsequent to step S140, the driving assistance device 50 may calculate the braking target deceleration Ab, based on the time to collision ETTC considering the acceleration/deceleration. The driving assistance device 50 calculates the braking target deceleration Ab so that, for example, the absolute value of the braking target deceleration Ab is increased, in this case, the deceleration of the vehicle 80 is increased, as the time to collision ETTC considering the acceleration/deceleration is reduced. In the case where the time to collision ETTC is unchanged from the time to collision ETTC calculated the previous time, the driving assistance device 50 determines that the preceding vehicle brake lights 92 are not turned on. In the case where the time to collision ETTC is increased from the time to collision ETTC calculated the previous time, the driving assistance device 50 determines that the preceding vehicle brake lights 92 are not turned on.

Modification 2-3

The driving assistance device 50 may determine whether the preceding vehicle brake lights 92 are turned on, for example, based on a brake operation state of the preceding vehicle 90. Specifically, the inter-vehicle communication device 40 performs inter-vehicle communication with the preceding vehicle 90 to acquire a brake operation state of the preceding vehicle 90. In step S110, the driving assistance device 50 acquires, from the inter-vehicle communication device 40, a brake operation state of the preceding vehicle 90 in addition to the information described above. In the case where a brake pedal of the preceding vehicle 90 is pressed, the driving assistance device 50 determines in step S140 that the preceding vehicle brake lights 92 are turned on. In the case where the brake pedal of the preceding vehicle 90 is not pressed, the driving assistance device 50 determines that the preceding vehicle brake lights 92 are not turned on.

The driving assistance device 50 may perform the above determination, based on a combination of the lighting state of the preceding vehicle headlights 91, the acceleration/deceleration of the preceding vehicle 90, the lighting state of the auxiliary brake light of the preceding vehicle 90, the time to collision ETTC considering the acceleration/deceleration, and the brake operation state of the preceding vehicle 90.

Other Embodiments

The present disclosure is not limited to the embodiments described above, and the embodiments may be changed as appropriate. It is needless to say that in the embodiments, the elements constituting the embodiments are not necessarily essential unless the elements are specified to be essential or the elements are considered to be apparently essential in principle.

The control unit and the method thereof described in the present disclosure may be implemented by a dedicated computer provided by configuring a processor and a memory programmed to execute one or more functions embodied by a computer program. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured by one or more hardware logic circuits. Furthermore, the computer program may be stored as instructions executed by a computer in a non-transitory tangible computer-readable storage medium.

(1) In the above embodiment, the driving assistance device 50 determines whether the preceding vehicle brake lights 92 are turned on, based on a combination of the lighting state of the preceding vehicle headlights 91, the acceleration/deceleration of the preceding vehicle 90, and the lighting state of the auxiliary brake light 93 of the preceding vehicle 90. However, the driving assistance device 50 may determine whether the preceding vehicle brake lights 92 are turned on, based on only two conditions: the lighting state of the preceding vehicle headlights 91 and the acceleration/deceleration of the preceding vehicle 90. Alternatively, the driving assistance device 50 may determine whether the preceding vehicle brake lights 92 are turned on, based on only the lighting state of the auxiliary brake light 93 of the preceding vehicle 90.

(2) In the above embodiment, the driving assistance device 50 calculates the ACC target acceleration/deceleration Aacc, based on K1, Lp, Lt, K2, Vf, and Vc of the relational expression (1-1). As described above, Lp is the inter-vehicle distance between the vehicle 80 and the preceding vehicle 90. Lt is the target inter-vehicle distance between the vehicle 80 and the preceding vehicle 90, and is represented by the relational expression (1-2). Vf is the speed of the preceding vehicle 90. Vc is the speed of the vehicle 80. K1 is the feedback gain of the error between the inter-vehicle distance and the target inter-vehicle distance. K2 is the feedback gain of the error in the relative speed of the preceding vehicle 90 to the vehicle 80. h is the time required for the vehicle 80 to reach the position of the preceding vehicle 90 when the vehicle 80 travels at the current speed of the vehicle 80. Ls is a constant set by an experiment, a simulation, or the like.

However, the driving assistance device 50 may not necessarily calculate the ACC target acceleration/deceleration Aacc, based on K1, Lp, Lt, K2, Vf, and Vc of the relational expression (1-1). The driving assistance device 50 may calculate the ACC target acceleration/deceleration Aacc, for example, based on the time to collision ETTC considering the acceleration/deceleration. Specifically, the driving assistance device 50 may calculate the ACC target acceleration/deceleration Aacc so that the deceleration of the ACC target acceleration/deceleration Aacc is increased in the case where the time to collision ETTC considering the acceleration/deceleration is reduced, for example, in the case where the vehicle 80 approaches the preceding vehicle 90. Furthermore, the driving assistance device 50 calculates the ACC target acceleration/deceleration Aacc so that the acceleration of the ACC target acceleration/deceleration Aacc is increased in the case where the time to collision ETTC considering the acceleration/deceleration is increased, for example, in the case where the vehicle 80 moves away from the preceding vehicle 90.

(3) In the above embodiment, the vehicle 80 includes an internal combustion engine. However, the vehicle 80 may not necessarily include an internal combustion engine. For example, the vehicle 80 may be an electric vehicle such as an electric automobile or a hybrid automobile, or a fuel cell automobile.

(4) In the above embodiment, the driving assistance device 50 determines whether the preceding vehicle headlights 91 are turned on, based on the change in the brightness that is the change over time in the brightness of the image of the area in front of the vehicle 80 acquired in step S110. However, the determination may not necessarily be based on the change in the brightness. The driving assistance device 50 may determine whether the preceding vehicle headlights 91 are turned on, for example, based on the brightness and a brightness gradient of the image of the area in front of the vehicle 80 acquired in step S110. In the above embodiment, the driving assistance device 50 determines the lighting state of the auxiliary brake light 93 of the preceding vehicle 90, based on the brightness of the rear portion of the preceding vehicle 90 displayed in the image acquired in step S110. However, the determination may not necessarily be based on the brightness. The driving assistance device 50 may determine the lighting state of the auxiliary brake light 93 of the preceding vehicle 90, for example, based on the brightness and a brightness gradient of the rear portion of the preceding vehicle 90 displayed in the image acquired in step S110.

What is claimed is:

1. A driving assistance device comprising:

a determination unit that determines whether a brake light of a preceding vehicle located in front of a vehicle is turned on, based on a lighting state of a headlight of the preceding vehicle and an acceleration/deceleration of the preceding vehicle; and a calculation unit that calculates a target acceleration/deceleration of the vehicle, based on a determination by the determination unit of whether the brake light of the preceding vehicle is turned on; and a control unit that controls an acceleration/deceleration of the vehicle, wherein the determination unit determines that the brake light is turned on, in a case where the headlight of the preceding vehicle is turned on and the preceding vehicle is decelerated, and the vehicle is accelerated or decelerated according to the target acceleration/deceleration.

2. The driving assistance device according to claim 1, wherein the determination unit determines the lighting state of the headlight of the preceding vehicle, based on a brightness of an image of a rear portion of the preceding vehicle.

3. The driving assistance device according to claim 1, wherein the determination unit determines the lighting state of the headlight of the preceding vehicle, based on an amount of solar radiation from an outside of the vehicle.

4. The driving assistance device according to claim 1, wherein the determination unit determines the lighting state of the headlight of the preceding vehicle, based on a lighting state of a headlight of the vehicle.

5. The driving assistance device according to claim 1, wherein the determination unit determines whether at least one or more brake lights of the preceding vehicle is turned on, based on a time to collision between the vehicle and the preceding vehicle based on the acceleration/deceleration of the vehicle and an acceleration/deceleration of the preceding vehicle.

6. The driving assistance device according to claim 5, wherein the calculation unit calculates the target acceleration/deceleration, based on the time to collision between the vehicle and the preceding vehicle based on the acceleration/deceleration of the vehicle and the acceleration/deceleration of the preceding vehicle.

7. The driving assistance device according to claim 1, further comprising an acquisition unit that acquires a brake operation state of the preceding vehicle through inter-vehicle communication, wherein the determination unit determines whether at least one or more brake lights of the preceding vehicle is turned on, based on the brake operation state of the preceding vehicle.

8. The driving assistance device according to claim 7, wherein the acquisition unit acquires an acceleration/deceleration of the preceding vehicle through the inter-vehicle communication, and the determination unit determines whether at least one of the one or more brake lights of the preceding vehicle is turned on, based on the acceleration/deceleration of the preceding vehicle acquired by the acquisition unit.

9. The driving assistance device according to claim 1, wherein in response to the determination unit determining that at least one or more brake lights of the preceding vehicle is turned on, the calculation unit calculates a braking target deceleration at which the vehicle is decelerated more than at an Adaptive Cruise Control (ACC) target acceleration/deceleration at which a distance from the vehicle to the preceding vehicle is constant, and the control unit controls the vehicle so that the acceleration/deceleration of the vehicle corresponds to the braking target deceleration.

10. The driving assistance device according to claim 1, further comprising a prefill execution unit that in a case where a brake light of another vehicle other than the vehicle and the preceding vehicle is turned on, causes a gap between a brake pad and a brake disc of the vehicle to be smaller than in a case where the brake light of the another vehicle is not turned on.

11. The driving assistance device according to claim 10, wherein in a case where a red light of a traffic signal in front of the vehicle is turned on, the prefill execution unit causes the gap between the brake pad and the brake disc to be smaller than in a case where the brake light of the another vehicle is not turned on.

12. The driving assistance device according to claim 10, wherein in a case where a speed of the vehicle is greater than a speed threshold, the prefill execution unit causes the gap between the brake pad and the brake disc to be smaller than in a case where the brake light of the another vehicle is not turned on.

13. The driving assistance device according to claim 10, wherein in a case where a time to collision between the vehicle and an object different from the vehicle based on a speed of the vehicle and the object is less than a time threshold, the prefill execution unit causes the gap between the brake pad and the brake disc to be smaller than in a case where the brake light of the another vehicle is not turned on.

14. A driving assistance device according to claim 1, wherein a determination unit that determines whether at least one of a plurality of brake lights arranged in a width direction in a rear portion of a preceding vehicle located in front of a vehicle is turned on, based on a lighting state of an auxiliary brake light that is disposed at a different position from the plurality of brake lights of the preceding vehicle and is turned on when at least one of the plurality of brake lights of the preceding vehicle is turned on, wherein the plurality of brake lights comprises tail lamps of the preceding vehicle, and the auxiliary brake light comprises a third brake light of the preceding vehicle.

15. The driving assistance device according to claim 14, wherein the determination unit determines the lighting state of the auxiliary brake light, based on a brightness of an image of a rear portion of the preceding vehicle.

16. The driving assistance device according to claim 14, wherein the determination unit determines whether at least one of the plurality of brake lights of the preceding vehicle is turned on, based on a time to collision between the vehicle and the preceding vehicle based on the acceleration/deceleration of the vehicle and an acceleration/deceleration of the preceding vehicle.

17. The driving assistance device according to claim 16, wherein the calculation unit calculates the target acceleration/deceleration, based on the time to collision between the vehicle and the preceding vehicle based on the acceleration/deceleration of the vehicle and the acceleration/deceleration of the preceding vehicle.

18. The driving assistance device according to claim 14, further comprising an acquisition unit that acquires a brake operation state of the preceding vehicle through inter-vehicle communication, wherein the determination unit determines whether at least one of the plurality of brake lights of the preceding vehicle is turned on, based on the brake operation state of the preceding vehicle.

19. The driving assistance device according to claim 18, wherein the acquisition unit acquires an acceleration/deceleration of the preceding vehicle through the inter-vehicle communication, and the determination unit determines whether at least one of the plurality of brake lights of the preceding vehicle is turned on, based on the acceleration/deceleration of the preceding vehicle acquired by the acquisition unit.

20. The driving assistance device according to claim 14, wherein in response to the determination unit determining that at least one of the plurality of brake lights of the preceding vehicle is turned on, the calculation unit calculates a braking target deceleration at which the vehicle is decelerated more than at an Adaptive Cruise Control (ACC) target acceleration/deceleration at which a distance from the vehicle to the preceding vehicle is constant, and the control unit controls the vehicle so that the acceleration/deceleration of the vehicle corresponds to the braking target deceleration.

21. The driving assistance device according to claim 14, further comprising a prefill execution unit that in a case where a brake light of another vehicle other than the vehicle and the preceding vehicle is turned on, causes a gap between a brake pad and a brake disc of the vehicle to be smaller than in a case where the brake light of the another vehicle is not turned on.

22. The driving assistance device according to claim 21, wherein in a case where a red light of a traffic signal in front of the vehicle is turned on, the prefill execution unit causes the gap between the brake pad and the brake disc to be smaller than in a case where the brake light of the another vehicle is not turned on.

23. The driving assistance device according to claim 21, wherein in a case where a speed of the vehicle is greater than a speed threshold, the prefill execution unit causes the gap between the brake pad and the brake disc to be smaller than in a case where the brake light of the another vehicle is not turned on.

24. The driving assistance device according to claim 21, wherein in a case where a time to collision between the vehicle and an object different from the vehicle based on a speed of the vehicle and the object is less than a time threshold, the prefill execution unit causes the gap between the brake pad and the brake disc to be smaller than in a case where the brake light of the another vehicle is not turned on.

25. A driving assistance method comprising:

determining whether a brake light of a preceding vehicle located in front of a vehicle is turned on, based on a headlight of the preceding vehicle being turned on and deceleration of the preceding vehicle;

calculating a target acceleration/deceleration of the vehicle, based on a determination of whether the brake light of the preceding vehicle is turned on; and controlling an acceleration/deceleration of the vehicle, wherein the vehicle is accelerated or decelerated according to the target acceleration/deceleration.

26. The driving assistance method according to claim 25, further comprising:

in a case where the headlight of the preceding vehicle are not turned on, or in a case where acceleration/deceleration of the preceding vehicle is not detected, determining whether at least one of a plurality of brake lights arranged in a width direction in a rear portion of a preceding vehicle located in front of a vehicle is turned on, based on a lighting state of an auxiliary brake light that is disposed at a different position from the brake lights of the preceding vehicle and is turned on when at least one of the brake lights of the preceding vehicle is turned on.

* * * * *